United States Patent Office 3,734,931
Patented May 22, 1973

3,734,931
5'-SUBSTITUTED GRISEOFULVINS
Howard Newman, Monsey, and Thomas Lynn Fields, Pearl River, N.Y., assignors to American Cyanamid Company, Stamford, Conn.
No Drawing. Continuation-in-part of applications Ser. No. 26,404, Apr. 7, 1970, and Ser. No. 824,310, May 13, 1969, now abandoned. This application Nov. 10, 1971, Ser. No. 197,521
Int. Cl. C07d 5/36
U.S. Cl. 260—346.2 G
10 Claims

ABSTRACT OF THE DISCLOSURE

This disclosure describes compounds of the class of 5'-substituted griseofulvins useful as antifungal agents.

CROSS-REFERENCE TO RELATED APPLICATIONS

This application is a continuation-in-part of our co-pending application Ser. No. 26,404, filed Apr. 7, 1970, now abandoned which, in turn, is a continuation-in-part of our application Ser. No. 824,310, filed May 13, 1969, now abandoned.

BRIEF SUMMARY OF THE INVENTION

This invention relates to new organic compounds and, more particularly, is concerned with novel 5'-substituted griseofulvins and with methods of preparing these compounds. The novel compounds of the present invention may be represented by the following general formula:

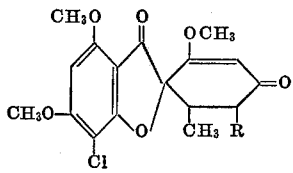

wherein R is formyl, cyano, lower alkoxalyl, isonitrosomethyl, or a moiety of the formula:

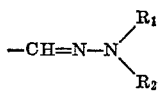

wherein $R_1$ and $R_2$ are the same or different and are each lower alkyl of from one to four carbon atoms such as methyl, ethyl, isopropyl, n-butyl, etc. Suitable lower alkoxalyl groups are those having from 3 to 6 carbon atoms such as, for example, isopropoxalyl, isobutoxalyl, sec-butoxalyl, and the like.

DETAILED DESCRIPTION OF THE INVENTION

The novel compounds of the present invention are generally obtainable as white to pale yellow crystalline materials having characteristic melting points and absorption spectra and which may be purified by recrystallization from common organic solvents such as methanol, ethanol, and acetonitrile. They are appreciably soluble in many organic solvents such as methylene chloride, chloroform, benzene, toluene, and the like but are relatively insoluble in water and aqueous acid.

The novel 5'-substituted griseofulvins of the present invention may all be readily prepared from griseofulvin as illustrated in the following reaction scheme (partial structures only are shown since all reactions occur at the 5'-position):

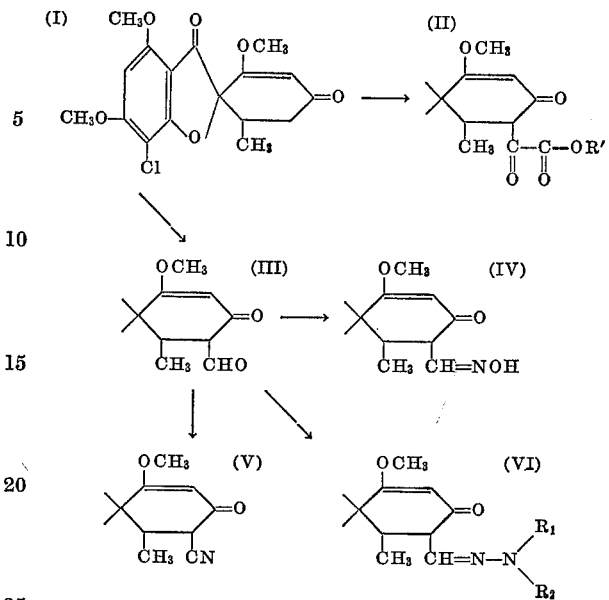

wherein R' is lower alkyl of from 1 to 4 carbon atoms; and $R_1$ and $R_2$ are as hereinabove defined. In accordance with the above reaction scheme, griseofulvin (I) is treated with a di(lower alkyl) oxalate in the presence of a base such as sodium hydride, sodium methoxide or sodium ethoxide to provide the corresponding 5'-lower alkoxalyl-griseofulvin (II). This reaction is best carried out in an anhydrous solvent such as benzene, toluene, diethyl ether, methanol or ethanol at a temperature of from about 15° C. to about 60° C., preferably 25°–30° C. for a period of time of from about 40 to about 100 hours. The product (II) may be extracted from the acidified reaction mixture with aqueous sodium hydroxide, precipitated by acidifying the extract, and recrystallized from lower alkanols. Treatment of 5'-formylgriseofulvin (III) with an N,N-di(lower alkyl)hydrazine affords the corresponding 5'-hydrazonomethyl derivatives (VI). Suitable N,N-di(lower alkyl)hydrazines which may be employed are, for example, N,N-diethyl hydrazine, N,N-di-n-propylhydrazine, N-methyl-N-ethylhydrazine, and the like. This reaction is best carried out in a lower alkanol as solvent at the reflux temperature for a period of a few hours. The product (VI) separates from the reaction solution upon cooling as pale yellow crystals.

The novel compounds of the present invention are useful as antifungal agents and possess broad-spectrum antifungal activity in vitro against a variety of standard laboratory microorganisms as determined by the agar-dilution streak-plate technique. In this assay, the compounds to be tested are made up to contain 2.5 mg. of test compound per milliliter of solution. Observing sterile techniques, two-fold serial dilutions are made of each test solution. One milliliter of each of the original solutions and of each of the serial dilutions is then added to 9 ml. of warm sterile nutrient agar capable of supporting growth of the fungal test cultures. The standard sterile nutrient agar solutions containing the different dilutions of the test compounds, along with suitable and comparable control dilutions containing no test compound, are then allowed to cool in Petri dishes thereby forming solidified agar plates. The test yeast-like fungi are prepared for use by growing in broth overnight. The spores of the filamentous fungi are harvested from mature agar slant cultures and are suspended in sterile physiological saline solution. A loopful of each of the resulting live suspensions is then, still employing sterile techniques, streaked upon the surfaces of each of the agar plates and the resulting streaked plates are then incubated. After an appropriate period of time, each of the streaks on each of the plates is inspected visually and the extent, if any, of fungal growth is noted. The minimal inhibitory concentration (expressed in micrograms per milliliter) is defined as the concentration of test compound causing complete inhibition of growth of any particular organism.

The standard laboratory microorganisms employed in the above-described assay were the following:

(1) *Microsporum canis* ATCC 10214
(2) *Microsporum gypseum* ATCC 14683
(3) *Trichophyton tonsurans* NIH 662
(4) *Trichophyton mentagrophytes* (E 11)
(5) *Trichophyton rubrum* (E 97)

In a representative operation, and merely by way of illustration, the minimal inhibitory concentration of typical compounds of this invention against the above test organisms as determined in the above-described assay are set forth in Table I below:

TABLE I

In vitro antifungal activities, minimal inhibitory conc. (mcg./ml.)

| Compound | Fungi | | | | |
|---|---|---|---|---|---|
| | (1) | (2) | (3) | (4) | (5) |
| 5'-methoxalylgriseofulvin | 0.5 | 2.5 | 5 | 5 | 1 |
| 5'-ethoxalylgriseofulvin | 1 | 5 | 5 | 5 | 1 |
| 5'-formylgriseofulvin | 5 | 50 | 25 | 25 | 10 |
| 5'-cyanogriseofulvin | 2.5 | 5 | 10 | 10 | 5 |
| 5'-formylgriseofulvin, 5'-oxime | 5 | 10 | 25 | 25 | 10 |
| 5'-formylgriseofulvin, N,N-dimethylhydrazone | 25 | 25 | 50 | 50 | 25 |

As antifungals, compounds of this invention may be administered orally or parenterally in the usual pharmaceutical forms, or possibly in the diet, and/or as compositions of active ingredient in an edible carrier. Such compositions may include tablets, scored or unscored, or hard or soft shell capsules. Excipients may include lactose, starch, buffers, disintegrating agents, lubricants, homogenizing agents, and the like. Oral and parenteral compositions may include similar agents and also preservatives, emulsifiers, surfactants, stabilizers and the like in solutions, suspensions, syrups, elixirs, etc. in either aqueous or non-aqueous systems. Additional excipients might include sweeteners, flavorings, colorings, or perfumes. Topical preparations, it is expected, will prove particularly useful. Such compositions would be designed for administration to subjects exposed to, or infected with sensitive fungi for either treatment or prophylaxis and may include, in addition to the foregoing, ointments, creams, emulsions, unguents, salves, emollients, sprays, washes or the like. In addition, compounds of this invention may be used in the form of solutions, suspensions, emulsion, washes, powders, dusts, mists, soaps, sprays, aerosols, drenches, or other forms for the purpose of cleaning, disinfecting, or sterilizing surgical instruments, laboratory glassware or instruments, hospital walls or other surfaces, linens, dishes, laboratory tables, coops, cages, or the like. Likewise these compounds might be incorporated into soaps, detergents, sprays or the like in the home, farm, office or elsewhere with the purpose of preventing or minimizing infection or contamination with sensitive fungi. Painting, spraying, immersion or other means of effecting contact may be applied.

The invention will be described in greater detail in conjunction with the following specific examples.

EXAMPLE 1

5'-methoxalylgriseofulvin

Sodium hydride (50% suspension in oil—1.6 g., 32 mmoles) was added to a slurry of griseofulvin (5.6 g.—16 mmoles) in 40 ml. of sodium-dried benzene contained in a 125 ml. round bottom flask. After thirty minutes, dimethyl oxalate (3.8 g.—32 mmoles) was added and the reaction mixture was stirred at room temperature for 72 hours. The yellow slurry was diluted with 60 ml. of benzene, cooled in an ice bath and acidified by the cautious addition of 6 ml. of glacial acetic acid. Unreacted starting material was removed by filtration and the yellow filtrate was extracted thrice with 30 ml. portions of 1 N sodium hydroxide. The combined alkaline extracts were washed with ether and acidified by the addition of 12 ml. of glacial acetic acid. The gummy pale yellow solid which precipitated was extracted into methylene chloride. The methylene chloride solution was washed with water, dried over anhydrous sodium sulfate, filtered and concentrated to a yellow solid in vac. Recrystallization from methanol yielded 560 mg. of white, crystalline 5'-methoxalylgriseofulvin; M.P. 205°–208° C.

EXAMPLE 2

5'-ethoxalylgriseofulvin

Sodium hydride (50% suspension in oil-400 mg.; 8 mmoles) was added to a slurry of griseofulvin (1.4 g.—4 mmoles) in 10 ml. of sodium-dried toluene contained in a 50 ml. round bottom flask. After ten minutes, diethyl oxalate (1.16 g.—8 mmoles) was added and the reaction mixture was stirred at room temperature for ninety hours. The yellow slurry was then diluted with 30 ml. of toluene and was acidified by the cautious addition of 1 ml. of glacial acetic acid. Unreacted starting material was removed by filtration and the yellow filtrate was extracted thrice with 10 ml. portions of 1 N sodium hydroxide. The combined alkaline extracts were adjusted to pH 3 with 1 N HCl and the gummy yellow solid which precipitated was extracted into chloroform. The chloroform solution was washed with water, dried over anhydrous sodium sulfate, filtered and concentrated in vacuo to yield 132 mg. of crystalline 5'-ethoxalylgriseofulvin. An analytical sample was obtained by recrystallization from methanol; M.P. 209°–212° C.

EXAMPLE 3

5'-formylgriseofulvin

Sodium methoxide (4.32 g.—80 mmoles) was cautiously added, with stirring and external cooling, to 150 ml. of methyl formate contained in a 500 ml. round bottom flask. Griseofulvin (14.0 g.—40 mmoles) was added portionwise over a fifteen minute period and the resultant thick white slurry was stirred at room temperature. After one hour the reaction mixture began turning yellow. After forty hours the bright yellow reaction mixture was concentrated to dryness in vacuo. The residual solid was thoroughly mixed with 150 ml. of water and filtered. The insoluble material (5.1 g.) was identified by thin layer chromatography and infra-red as unreacted griseofulvin. The alkaline filtrate was cooled in an ice bath and 10 ml. of glacial acetic was added with vigorous stirring. The pale yellow crystals which precipitated were collected by filtration, washed with water and dried in vacuo over $P_2O_5$ at 60° C. The yield of analytically pure 5'-formygriseofulvin (based on unrecovered starting material) was 9.0 g. (94.1%); M.P. 192° C.

A number of different solvents could be used in the above reaction, e.g. benzene, toluene, methanol and 1,2-dimethoxyethane. Also, other bases could be used instead of sodium methoxide, e.g. sodium ethoxide, sodium hydride, etc.

EXAMPLE 4

5'-cyanogriseofulvin

O,N-bis(trifluoroacetyl)hydroxylamine (2.25 g.—10 mmoles) and pyridine (3 ml.) were added to a slurry of 5'-formylgriseofulvin (3.81 g.—10 mmoles) in 50 ml. of benzene. The reaction mixture was brought to reflux and within fifteen minutes a clear solution was obtained. Refluxing was continued for a period of three and one-half hours. After cooling, the benzene solution was washed thrice with water, dried over anhydrous sodium sulfate, filtered, and concentrated to a yellow-tan solid in vacuo. The crude nitrile was slurried in 25 ml. of ethanol at reflux temperature and then cooled in an ice bath. The white crystals of analytically pure 5'-cyanogriseofulvin were collected and dried in vacuo over $P_2O_5$ at 80° C. The yield was 2.8 g. (74.4%).

EXAMPLE 5

5'-formylgriseofulvin, 5'-oxime

A mixture of 5'-formylgriseofulvin (4.58 g., 12 mmoles) hydroxylamine hydrochloride (0.92 g., 13.2 mmoles) and sodium acetate (1.08 g., 13.2 mmoles) in 70 ml. of methanol was stirred at room temperature for two hours. The slurry was then poured into 400 ml. of water and the light tan solid was collected by filtration, washed well with water and dried in vacuo over phosphorous pentoxide. The yield of crude oxime was 2.95 g. (83%), M.P. 228°-231° C. An anlytical sample was obtained by recrystallization from acetonitrile, M.P. 240°-242° C.

EXAMPLE 6

5'-formylgriseofulvin, N,N-dimethylhydrazone

Dimethyl hydrazine (198 mg., 3.3 mmoles) was added dropwise to a suspension of 5'-formylgriseofulvin (1.143 g., 3 mmoles) in 10 ml. of methanol. The suspension was stirred at room temperature for 1.5 hours and then refluxed for 0.5 hour. Upon refluxing a clear yellow solution was obtained which deposited crystals upon cooling. After cooling in an ice bath the pale yellow crystals were collected and dried in vacuo at 80° C. on phosphorous pentoxide. The yield of the N,N-dimethylhydrazone was 0.980 g. (70%). An analytical sample was obtained by recrystallization from ethanol, M.P. 137°-140° C.

What is claimed is:

1. A compound of the formula:

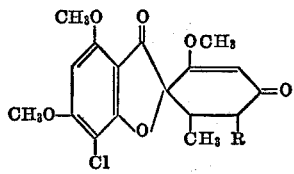

wherein R is selected from the group consisting of formyl, cyano, lower alkoxalyl, isonitrosomethyl, and a moiety of the formula:

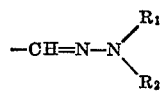

wherein $R_1$ is lower alkyl and $R_2$ is a lower alkyl.

2. The compound according to claim 1 wherein R is methoxalyl.
3. The compound according to claim 1 wherein R is ethoxalyl.
4. The compound according to claim 1 wherein R is n-propoxalyl.
5. The compound according to claim 1 wherein R is n-butoxalyl.
6. The compound according to claim 1 wherein R is formyl.
7. The compound according to claim 1 wherein R is cyano.
8. The compound according to claim 1 wherein R is isonitrosomethyl.
9. The compound according to claim 1 wherein R is a moiety of the formula:

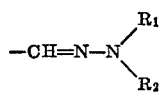

wherein $R_1$ is methyl and $R_2$ is methyl.

10. The compound according to claim 1 wherein R is a moiety of the formula:

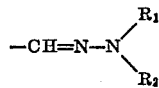

wherein $R_1$ is ethyl and $R_2$ is ethyl.

References Cited

Newman et al.: Chem. Abstracts (1971), vol. 74, 22,628.

ALEX MAZEL, Primary Examiner

B. DENTZ, Assistant Examiner

U.S. Cl. X.R.

424—285